(12) United States Patent
Östrup et al.

(10) Patent No.: US 9,220,024 B2
(45) Date of Patent: Dec. 22, 2015

(54) METHOD AND APPARATUS FOR ADJUSTING A CELL SIZE IN A WIRELESS COMMUNICATION SYSTEM

(75) Inventors: Peter Östrup, Linköping (SE); Stefan Johansson, Linköping (SE)

(73) Assignee: Optis Wireless Technology, LLC, Plano, TX (US)

(*) Notice: Subject to any disclaimer, the term of this patent is extended or adjusted under 35 U.S.C. 154(b) by 44 days.

(21) Appl. No.: 14/122,493

(22) PCT Filed: Sep. 26, 2011

(86) PCT No.: PCT/SE2011/051143
§ 371 (c)(1),
(2), (4) Date: Nov. 27, 2013

(87) PCT Pub. No.: WO2012/173547
PCT Pub. Date: Dec. 20, 2012

(65) Prior Publication Data
US 2014/0106738 A1   Apr. 17, 2014

Related U.S. Application Data

(60) Provisional application No. 61/497,267, filed on Jun. 15, 2011.

(51) Int. Cl.
*H04W 24/02* (2009.01)
*H04W 24/08* (2009.01)

(52) U.S. Cl.
CPC .............. *H04W 24/02* (2013.01); *H04W 24/08* (2013.01)

(58) Field of Classification Search
USPC ................................ 455/422.1, 418, 423, 525
See application file for complete search history.

(56) References Cited

U.S. PATENT DOCUMENTS

| | | | |
|---|---|---|---|
| 5,898,682 A * | 4/1999 | Kanai | 370/331 |
| 7,817,996 B2 * | 10/2010 | Brunner | 455/422.1 |
| 2006/0246888 A1 | 11/2006 | Bender et al. | |
| 2006/0276216 A1 | 12/2006 | Tongen | |
| 2009/0318132 A1 * | 12/2009 | Chiou et al. | 455/423 |
| 2011/0081897 A1 * | 4/2011 | Beattie et al. | 455/418 |
| 2011/0182224 A1 * | 7/2011 | Ishii | 370/311 |
| 2012/0009972 A1 * | 1/2012 | Viering et al. | 455/525 |

FOREIGN PATENT DOCUMENTS

EP   2306766 A1   4/2011
WO   2006068559 A1   6/2006

* cited by examiner

*Primary Examiner* — Jinsong Hu
*Assistant Examiner* — Jean Chang
(74) *Attorney, Agent, or Firm* — Vincent J. Allen; Stephen Y. Liu; Carstens & Cahoon, LLP

(57) ABSTRACT

Method in a network node (110) comprised in a wireless communication system (100), for adjusting size of a cell (115) served by the network node (110). The method comprises estimating (304) a parameter value, related to a number of unsuccessful network connection attempts made by one or more user equipment (120) during a measurement period, and/or a number of dropped user equipment connections to the network node (110) during the measurement period. Further, the method comprises comparing (305) the estimated (304) parameter value with a threshold value, and adjusting (306) the size of the cell (115), based on the result of the comparison (305) of the estimated (304) parameter value with the threshold value.

24 Claims, 4 Drawing Sheets

METHOD AND APPARATUS FOR ADJUSTING A CELL SIZE IN A WIRELESS COMMUNICATION SYSTEM

TECHNICAL FIELD

Implementations described herein relate generally to a network node and a method in a network node. In particular is herein described how to adjust the size of a cell, served by the network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or even eNBs, may be connected to a gateway e.g. a radio access gateway, to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of GSM, UMTS, LTE and LTE-Advanced. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

In a communication system based on LTE, there are a number of idle mode parameters such as Qrxlevmin and Qhyst, that control the circumstances under which a user equipment shall camp on an LTE cell. In effect these parameters decide the size of the LTE cell at cell selection and cell reselection in idle mode. These parameters may herein be referred to as cell size parameters, and may for example set the lowest received signal strength, as perceived by a user equipment, for which the user equipment is allowed to utilize an LTE cell. Such cell size parameters may further be associated with a quality measurement. Thus, a quality threshold value may be set, which represent the lowest measured signal quality for which the user equipment may be allowed to camp on the LTE cell.

The idle mode parameters are set by the operator and this activity requires a cell planning effort. For example, the parameters may be set and/or adjusted based on manual signal strength measurements, i.e. the operator may drive around in a physically vehicle, make measurements on signal strength and adjust the parameters, which require manual work and takes time. Once set, the parameters are distributed to the user equipments via System Information.

It has been noticed that there are many timeouts of the Radio Resource Control (RRC) Connection Setup procedure. These timeouts may have occurred due to faulty tuned idle mode parameters, i.e. user equipment that should be camping on another cell, e.g. based on another access technology such as CDMA2000 cell, WCDMA cell, GSM cell etc was actually camping on the LTE cell. When attempting access to the LTE cell the RRC Connection Setup procedure may fail since the coverage at the cell border was in reality too poor.

SUMMARY

It is therefore an object to obviate at least some of the above mentioned disadvantages and to improve the performance in a wireless communication system.

According to a first aspect, the object is achieved by a method in a network node. The network node is comprised in a wireless communication system. The method aims at adjusting size of a cell served by the network node. The method comprises estimating a parameter value, related to a number of unsuccessful network connection attempts made by one or more user equipment during a measurement period, and/or a number of dropped user equipment connections to the network node during the measurement period. Further, the method comprises comparing the estimated parameter value with a threshold value. Also, in addition, the method comprises adjusting the size of the cell, based on the result of the comparison of the estimated parameter value with the threshold value.

According to a second aspect, the object is achieved by a network node. The network node is comprised in a wireless communication system. The network node aims at adjusting size of a cell served by the network node. The network node comprises a processing circuitry, configured to estimate a parameter value. The parameter value is related to the number of unsuccessful network connection attempts made by one or more user equipment during a measurement period, and/or the number of dropped user equipment connections to the network node during the measurement period. The processing circuitry is also configured to compare the estimated parameter value with a threshold value. In addition, the processing circuitry is further configured to adjust the size of the cell, based on the result of the comparison of the estimated parameter value with the threshold value.

Some advantages according to some embodiments comprise possibility to maintain and/or improve service quality while reducing manual work when setting system parameters for determining the cell size. Further, Operational Expenditure costs from cell planning (tuning) of idle mode parameters may be removed, or at least reduced. Further, accessibility Key Performance Indicators (KPIs), such as e.g. the number of successful network connections during a measurement period may be improved according to some embodiments. Thus, End-User satisfaction will be increased. Further, automatic tuning of cell size may be more effective than manual tuning, and in addition require less manual work (tuning) by a human operator. Some embodiments herein may utilize the RRC Connection Setup procedure, and the fact that many (or few) such procedures fail due to that the user equipment cannot reach the network with the RRC Connection Setup Complete message on DCCH, to automatically tune the network with regards to cell sizes. Thus an improved performance within the wireless communication network is provided.

Other objects, advantages and novel features of the methods and network nodes will become apparent from the following detailed description.

BRIEF DESCRIPTION OF THE DRAWINGS

The method and network node are described in more detail with reference to attached drawings illustrating examples of embodiments in which.

DETAILED DESCRIPTION

Embodiments herein are defined as a network node and a method in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
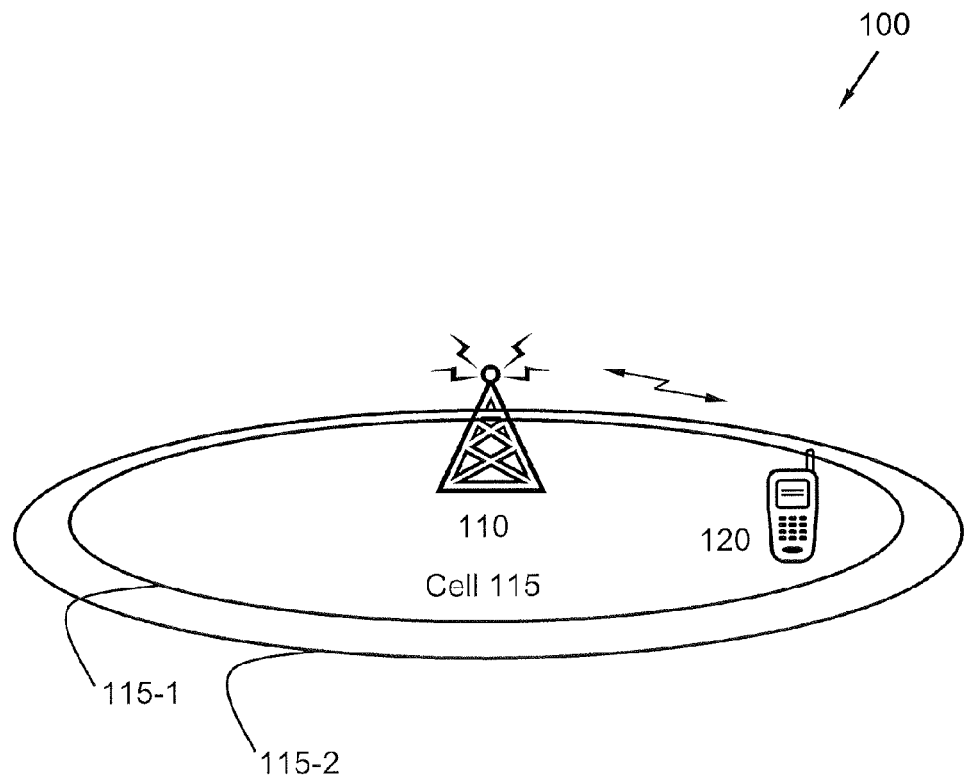
FIG. 1 is a block diagram illustrating a wireless communication system according to some embodiments.

FIG. 1 depicts a wireless communication system 100. The wireless communication system 100 may be based on technologies providing broadcasting information or data over a broadcast channel. Such technologies may comprise e.g. Wireless Local Area Network (WLAN), Wi-Fi network, Wireless Personal Area Network (WPAN), Bluetooth (trademark) or a wireless broadband network and/or network based on broadcasting of wireless data.

However, embodiments of the wireless communication system 100 may at least partly be based on radio access technologies such as e.g. 3rd Generation Partnership Project (3GPP) Long Term Evolution (LTE), LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few exemplary options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

It is to be noted that the embodiment illustrated in FIG. 1 is only a non-limiting example of a possible environment wherein the present method may be implemented.

Further, it may be noted that the wireless communication system 100 may be situated in a wireless communication landscape comprising a plurality of cells based on a plurality of radio access technologies, such as e.g. the once already enumerated above. Such cells based on different radio access technologies may be situated adjacent to each, or they may be somewhat, partly or entirely overlapping each other.

The purpose of the illustration in FIG. 1 is to provide a simplified, general overview of the methods and network nodes herein described, and the functionalities involved. The methods and network nodes will subsequently, as a non-limiting example, be described in a 3GPP/LTE environment, but the embodiments of the disclosed methods and network nodes may operate in a wireless communication system 100 based on another access technology.

The wireless communication system 100 comprises one network node 110, which is serving a cell 115, wherein a user equipment 120 may be situated.

The network node 110 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device, a relay station and/or a repeater or any other network node configured for communication with the user equipment 120 over a wireless interface, depending e.g. of the radio access technology and terminology used.

The user equipment 120 is configured to transmit radio signals comprising information to be received by the serving network node 110. Further, the user equipment 120 is configured to receive radio signals comprising information transmitted by the serving network node 110. The communication between the serving network node 110 and the user equipment 120 is thus made over a radio link.

The user equipment 120 may be represented by e.g. a wireless communication terminal, a mobile cellular phone, a Personal Digital Assistant (PDA), a wireless platform, a mobile station, a portable communication device, a laptop, a computer, a wireless terminal acting as a mobile relay, a Customer Premises Equipment (CPE), a Fixed Wireless Access (FWA) node or any other kind of device configured to communicate wirelessly with or via the serving network node 110.

The serving network node 110 controls the radio resource management within the cell 115, such as e.g. allocating radio resources to user equipment units 120 within the cell 115 and ensuring reliable wireless communication link between the network node 110 and the user equipment 120. The network node 110 may comprise an eNodeB, e.g. in an LTE-related wireless communication system 100.

Embodiments of the method described herein relates to estimation of a parameter value, which may be related to a number of unsuccessful network connection attempts made by one or more user equipment 120 during a measurement period, and/or a number of dropped user equipment connections to the network node 110 during the measurement period. The estimated parameter value may be compared with a threshold value and an adjustment of the size of the cell 115 may be made, based on the result of the comparison of the estimated parameter value with the threshold value.

Thereby, measurements of the number of network connection attempts, such as e.g. Radio Resource Control (RRC) Connection attempts made by the user equipment 120 to the network node 110, or on statistics of RRC Connection attempts made by from a plurality of user equipment 120 collected over a period of time according to different embodiments. Thereafter, based e.g. on the measurements of the number of RRC Connection attempts, it may be determined how big portion of the RRC Connection attempts that fail, with the cause "timeout", i.e. the network connection between the network node 110 and the user equipment 120 is lost during the procedure. However, according to some alternative embodiments, the drop rate may be measured and utilised instead, or in addition to the measurements of the number of RRC Connection attempts. The drop rate may comprise the number of established wireless connections of the user equipment 120 and the network node 110 that are unexpectedly disrupted.

Further, when the portion of failed RRC Connection Setup attempts due to timeout i.e. the user equipment 120 is lost, may be considered to be too large, e.g. if exceeding a threshold value, the idle mode parameter may be tuned, or set, such that the cell size may be reduced by changing the value of a cell edge threshold value related to the extension of the cell border, which cell edge threshold value serve as a threshold value for a user equipment 120 attempting to be served by the network node 110 in the cell 115, such that the user equipment 120 is served by the network node 110 if the received signal strength exceeds the cell edge threshold value, according to some embodiments.

Figure 2A:
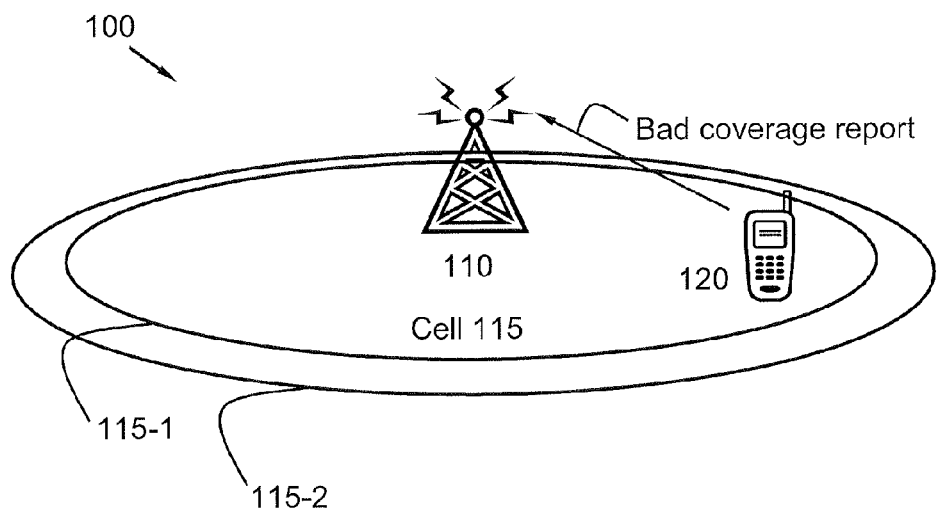
FIG. 2A is a combined block diagram and flow chart illustrating embodiments of a method in a network node.

FIG. 2A depicts a wireless communication system 100, according to some embodiments, wherein the user equipment 120 in connected mode is communicating via the network node 110, within the RRC connected mode cell border cell 115-1.

The idle mode cell border 115-2 is also depicted in FIG. 2A. In the illustration, the connected mode cell border 115-1 and the idle mode cell border 115-2 are different from each other, i.e. are illustrated as having different sizes. However, this is merely to be regarded as a non-limiting illustrative example. The connected mode cell 115-1 and the idle mode cell 115-2 may as well be of equal size, or be related to each other in an opposite way.

The wireless communication system 100 may be configured such that the user equipment 120 is triggered to perform a signal measurement and transmit a measurement report to be received by the network node 110. Such measurement report may be referred to as a bad-coverage report. The trigger for the user equipment 120 to send such measurement report/bad-coverage report may be that a measurement event has occurred, such as e.g. an A2 measurement event, i.e. that signals received from the serving network node 110 are received with a signal strength and/or signal quality below a threshold value. The signal strength and/or signal quality may be measured by the user equipment 120 with e.g. Reference Signal Received Power (RSRP), expressed in dBm or with Reference Signal Received Quality (RSRQ), expressed in dB according to different embodiments. The threshold value may comprise e.g. eventA2Threshold in case of an A2 event. However other measurement event types such as A1, A3, A4, A5, B1 and/or B2, to mention some non-limiting examples, wherein each of them may be associated with a corresponding threshold value may be utilized instead, or in addition according to different embodiments. Further specification concerning measurement events is given in the standard specification 3GPP TS 36.331.

In the illustrated scenario, the user equipment 120 is in connected mode and has established a communication with the network node 110. However, due to a detected low received signal power of signals received from the network node 110, such as if the received signal power is lower than a threshold value, the user equipment 120 may transmit the bad-coverage report, e.g. over a Dedicated Control Channel (DCCH), to be received by the network node 110.

If the parameter, or cell edge threshold parameter related to the size of the cell in connected mode is tuned i.e. set incorrectly, the network node 110 may experience an increase in radio link failures where, if tuned correctly, a redirection to another neighbouring radio access technology network, such as e.g. CDMA may have been possible. Such cell edge threshold parameter related to the size of the cell in connected mode may comprise e.g. an eventA2Threshold or an event B2Threshold, according to different embodiments.

Figure 2B:
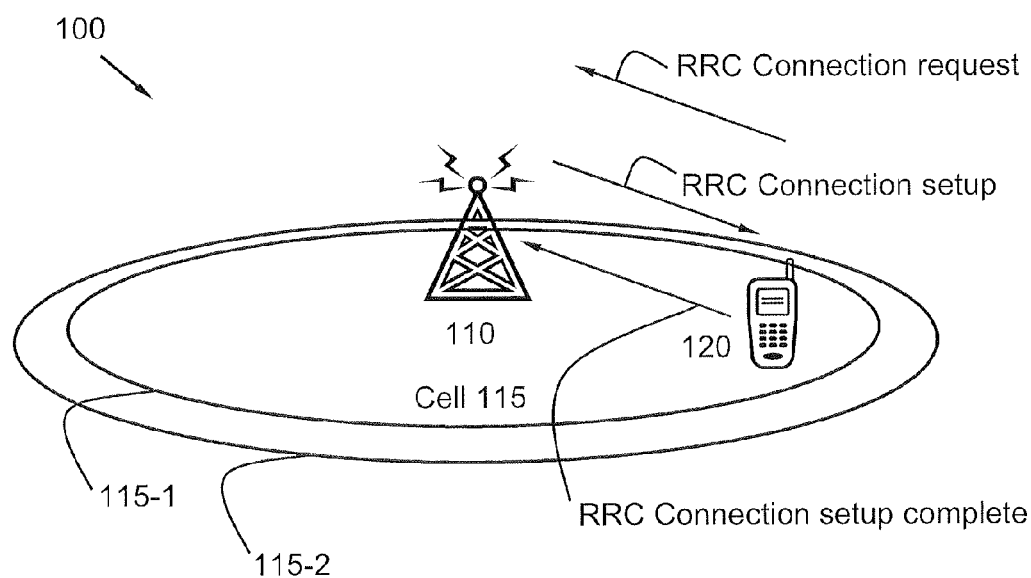
FIG. 2B is a combined block diagram and flow chart illustrating embodiments of a method in a network node.

FIG. 2B depicts the wireless communication system 100, according to some embodiments, wherein the user equipment 120 is in idle mode, and requesting resources from the network node 110 for entering the cell 115.

Thus the user equipment 120 may transmit a RRC connection request e.g. over a Random Access Channel (RACH), to be received by the network node 110. The network node 110, upon receiving the connection request from the user equipment 120, may as a response send an RRC connection setup message to be received by the user equipment 120, over a Common Control Channel (CCCH). The user equipment 120 may then confirm the setup by transmitting a RRC connection setup complete message over DCCH, to be received by the network node 110.

During troubleshooting activities in a live network it may have been observed that when an idle mode parameter such as a cell edge threshold parameter related to the extension of the cell border of the idle mode cell 115-2, is not tuned, i.e. set, correctly, the network node 110 may experience an abnormal number of timeouts of the above described RRC Connection Setup procedure, i.e. a number of timeouts exceeding a threshold value. Such idle mode parameter, or cell edge threshold parameter, may comprise, for example, Qrxlevmin.

Any of the above described measurements in connected mode or idle mode, that gives the smallest cell size may determine the cell size in any of the connected mode cell 115-1 and/or the idle mode cell 115-2, according to some embodiments. Thus, according to such embodiments, a comparison of cell size may be performed. An advantage with having with making such comparison may be that the cell 115, from the perspective of the user equipment 110 becomes equally accessible in idle mode and connected mode. Otherwise, if e.g. the connected mode cell 115-1 is smaller than the idle mode cell 115-2, the user equipment 110 may be disconnected from the network node 110 when receiving a phone call (and thus enter connected mode), which usually may not be desired.

Subsequently is an example of actions that may be performed within some embodiments of the present method illustrated, through which the cell size may be automatically tuned to achieve an optimal, or at least somewhat improved accessibility, as the size of the cell 115 may be adjusted without any further settings needed to be made by a human operator, which possibly saves time, work and money.

The measurements herein discussed may be performed periodically, such as e.g. at every 60 seconds or at another time interval considered appropriate, according to different embodiments. Thereby an update of the cell edge threshold parameter which determines the cell size may be made at the same time interval.

The cell size, determined by the cell edge threshold parameter values such as e.g. Qrxlevmin and a2Threshold or b2Threshold may be decreased when the statistical base is sufficient such as e.g. when a predetermined threshold value, e.g. 60, measurement procedures have been acquired, and also in addition, that either the percentage of failed RRC Connection Setup procedures due to timeout is higher than a threshold level, such as e.g. 3% or another appropriate level, or, the percentage of dropped connections due to Radio Link Failure is higher than a threshold level, such as e.g. 3%.

Further, the cell size may be increased when, after having acquired a statistical base of sufficient number higher than a predetermined threshold value, such as e.g. when 60 measurements have been received, if the percentage of failed RRC Connection Setup procedures due to timeout is lower than a threshold level, such as e.g. 3%, possibly minus a hysteresis, and in addition, the percentage of dropped connections due to Radio Link Failure is lower than a threshold level, such as e.g. 3%, possibly minus a hysteresis according to some embodiments.

Otherwise, if none of the conditions above is fulfilled, the cell size may be maintained, according to some embodiments.

Thus, embodiments of the network node 110 and the method in the network node 110 disclosed herein may utilize the RRC Connection Setup procedure, and the fact that many, or few such procedures fail due to that the user equipment 120 cannot reach the network with the RRC Connection Setup Complete message on DCCH, to adjust the cell sizes of cells 115 within the wireless communication system 100.

Yet a non-limiting example of an embodiment of the method and network node 110 presented herein will subsequently be described.

The number of RRC connection attempts and/or the number of failed RRC connection attempts due to "timeout" (UE Lost) may be measured.

Every t seconds, where t may be set to e.g. 60 seconds, or any other appropriate or convenient value, the number of RRC connection attempts that have been made during the past measuring period may be checked and the cell size may be reduced if the measure shows that the cell 115 is too large, i.e. exceeding a threshold value. The following formula may be used to determine if the cell 115 is to be reduced in size, according to some embodiments:

If (c1 & c2)=true then reduce the cell size by z dB. Qrxlevmin may in a non-limiting example be possible to adjust in steps of e.g. 2 dB, according to some embodiments.

Where:

$c_1$=(noofSuccRrcConnSetupProc+ noofFailedRrcConnSetupProc>$x$)

$c_2$=(noofFailedRrcConnSetupProc/(noofSuccRrcConnSetupProc+noofFailedRrcConnSetupProc)>$y$)

$x$=rrcConnSetupStatBase=e.g. 100

$y$=rrcConnSetupFailure=e.g. 30%

$z$=cellSizeAdjustmentStep=e.g. 2 dB

Descriptions:

Condition 1 (c1): This condition may be used to determine that the number of measurements is sufficiently large to base a cell size reduction action upon.

Condition 2 (c2): This condition may be used to determine if the statistical deviation of failed RRC connection attempts due to "timeout" is large enough to base a cell size reduction upon.

The following formula is used to determine if the cell 115 is to be increased in size:

If (c3 & c4)=true then increase cell size by z dB. Qrxlevmin may in a non-limiting example be possible to adjust in steps of e.g. 2 dB, according to some embodiments.

Where:

In case the size of the cell 115 was too small from the start or has been reduced too much the following action may be performed: If (c3 & c4)=true then increase the cell size by z dB. Qrxlevmin, in a non-limiting example, may be possible to adjust in steps of e.g. 2 dB, according to some embodiments.

Where:

$c_3$=(noofSuccRrcConnSetupProc+ noofFailedRrcConnSetupProc>$x$)

$c_4$=(noofFailedRrcConnSetupProc/(noofSuccRrcConnSetupProc+noofFailedRrcConnSetupProc)< ($y-h$))

$x$=rrcConnSetupStatBase=e.g. 100

$y$=rrcConnSetupFailure=e.g. 4%

$z$=cellSizeReductionStep=e.g. 2 dB $h$=rrcConnSetupFailureHyseresis=e.g. 0.5%

Descriptions:

Condition 1 (c3): This condition may be used to determine that the number of measurements is sufficiently large to base a cell size reduction action upon.

Condition 2 (c4): This condition may be used to determine if the statistical deviation of failed RRC connection attempts due to "timeout" is large enough to base a cell size increase upon.

According to some embodiments, an adjustment of a related connected mode parameter, i.e. the value of the cell edge threshold parameter in connected mode may be provided. In case the system is configured to run user equipment measurements monitoring the edge of the LTE coverage (bad coverage evaluation), for example measurement event A2, the thresholds for these measurements may be adjusted similarly to the adjustment of the idle mode cell parameter e.g. Qrxlevmin, to keep the cell size in connected mode aligned to the size in idle mode.

However, according to some embodiments, the size of the cell size in connected mode may be different from the cell size in idle mode. The cell size in connected mode may then be adjusted by a scaling factor, i.e. an offset value between the cell edge threshold parameter in connected mode and the cell edge threshold parameter in idle mode as previously mentioned.

Thus an offset value may be set between the connected mode parameter and the idle mode parameter, thereby rendering the size of an idle mode cell 115-2 and the size of a connected mode cell 115-1, according to some embodiments. Thereby, when the cell edge threshold parameter in idle mode is adjusted due to the measurements measured above, the cell edge threshold parameter in connected mode may be adjusted at the same time by addition of the offset value, according to some embodiments. Thereby, the cell size in connected mode may be changed simultaneously with adjustments of the size of the idle mode cell 115-2.

However, according to other embodiments, the size of the idle mode cell 115-2 and the size of the connected mode cell 115-1 may be set to be identical, such that the cell size may be the same when the user equipment 120 is in idle mode as when it is in connected mode. According to yet further embodiments, the size of the idle mode cell 115-2 and the size of the connected mode cell 115-1, may be adjusted independently from each other.

However, since connected mode assume measurements to be sent from the user equipment 120 to the network node 110 to take action, the connected mode threshold may be set to an offset o, or higher than the idle mode threshold according to some embodiments.

$$o = \text{connectedModeOffset} = \text{e.g. 3 dB}$$

Embodiments of the herein disclosed method and/or network node 110 may be improved with e.g. interference measurements and/or inter-base station communication, e.g. made over an X2 interface, to further improve the method embodiments in regards of increasing the cell size when radio conditions are changed. Thus, i.e. if the interference level from one or more neighbouring network nodes decrease due to e.g. new settings in those neighbouring network nodes, embodiments of the herein described method may try to increase the cell size, even if an increased cell size has previously lead to increased failure ratio.

Figure 3:
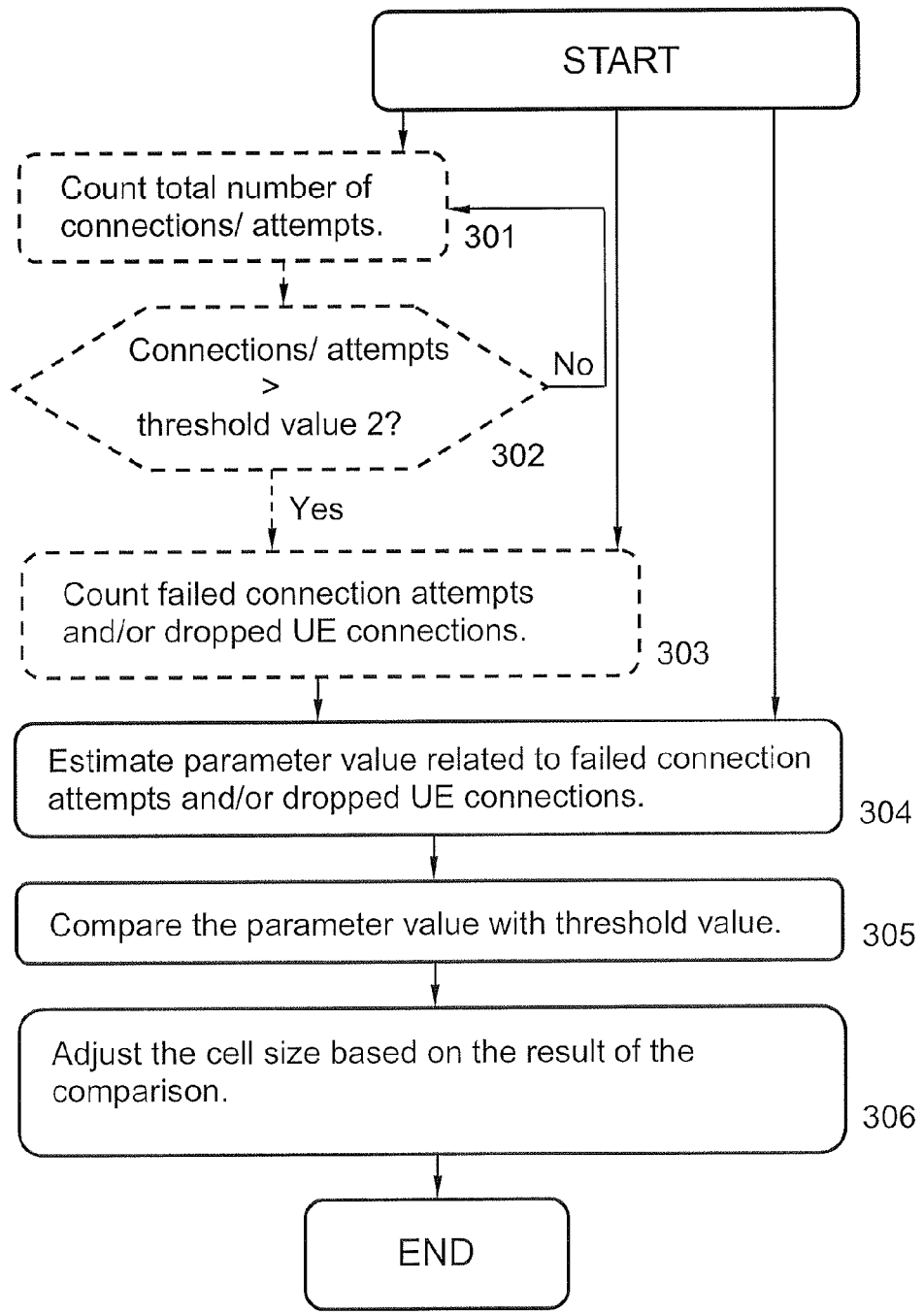
FIG. 3 is a schematic flow chart illustrating embodiments of a method in a network node.

FIG. 3 is a flow chart illustrating embodiments of a method in a network node 110. The network node 110, which may be referred to as a base station, is serving a cell 115. The network node 110 is comprised in a wireless communication system 100. The method aims at adjusting cell size of the cell 115, served by the network node 110. The cell 115 to be adjusted may comprise a connected mode cell 115-1 and an idle mode cell 115-2, which may be related to each other by an offset value according to some embodiments. The connected mode cell 115-1 may be adjusted by adding the offset value to the cell edge threshold parameter related to the extension of the cell border of the idle mode cell 115-2, which idle mode cell 115-2 may be adjusted according to the present method.

According to some alternative embodiments, the idle mode cell 115-2 and the connected mode cell 115-1 may be configured by different threshold values. Further, the network node 110 may serve one or more user equipment 120, situated within the cell 115.

To appropriately adjust the cell size, the method may comprise a number of actions 301-306. It is however to be noted that some of the described actions, e.g. action 301-306 may be performed simultaneously, or in a somewhat different chronological order than the enumeration indicates. It is in addition to be noted that at least some of the described actions, such as e.g. 301, 302 and/or 303 may be performed within some alternative embodiments, and not necessarily within all embodiments. The method may comprise the following actions:

Action 301

This action may be performed within some embodiments, but not necessarily within all embodiments of the method.

The number of RRC connection attempts made by the one or more user equipment 120 during the measurement period may be counted. Alternatively, or in addition, according to some embodiments, the total number of established connections made by the one or more user equipment 120 to the network node 110 during the measurement period, may be counted.

A successful RRC connection attempt may be recognised by that the network node 110 firstly receive a RRC connection request from the user equipment 120, provide a RRC connection setup to the user equipment 120 and thereafter receive a RRC connection setup complete from the user equipment 120.

An unsuccessful RRC connection attempt may be recognised by that the network node 110 receives a RRC connection request from the user equipment 120, but fails in receiving a corresponding RRC connection setup complete from the user equipment 120.

Action 302

This action may be performed within some embodiments wherein action 301 has been performed, but not necessarily within all embodiments of the method.

The counted 301 number of RRC connection attempts made by the one or more user equipment 120 during the measurement period, and/or the total number of established connections made by the one or more user equipment 120 to the network node 110 during the measurement period, may be compared with a second threshold value.

Action 303

This action may be performed within some embodiments, but not necessarily within all embodiments of the method.

The number of failed RRC connection attempts made by the one or more user equipment 120 during the measurement period may be counted. Alternatively, or in addition, according to some embodiments, the number of dropped user equipment connections to the network node 110 during the measurement period may be counted.

Action 304

A parameter value, related to a number of unsuccessful network connection attempts made by one or more user equipment 120 during the measurement period, and/or a number of dropped user equipment connections to the network node 110 during the measurement period is estimated.

The measurement period may be set to a predefined time value, such as e.g. 60 s, as a mere illustrative non-limiting example. Further, the measurement may be performed periodically at a time interval according to some embodiments.

The parameter value may comprise a ratio between the number of failed Radio Resource Control (RRC) connection attempts made by the one or more user equipment 120 and the total number of RRC connection attempts made by the one or more user equipment 120 during the measurement period. However, the parameter value may alternatively, or in addition also comprise a ratio between the number of dropped user equipment connections to the network node 110 and the total number of established connections made by the one or more user equipment 120 during the measurement period, according to some embodiments.

Further, according to some embodiments, any unsuccessful network connection attempts and/or dropped user equipment connections which may be made by any user equipment 120 to the network node 110, which is not situated within a predefined distance from the cell border of the cell 115 may be filtered out. It may thereby be avoided that user equipment 120 which are performing a handover to another, neighbouring cell are considered as unsuccessful network connection attempts and/or dropped user equipment connections to the network node 110, for the purpose of the present method. Thereby, intendedly terminated connections may be filtered out from the number of failed connections, as they are not related to the cell size.

Action 305

The estimated 304 parameter value is compared with a threshold value.

The threshold value may be predetermined such as e.g. be set to a drop-rate that has been considered acceptable, according to some embodiments. A non-limiting example of such acceptable drop-rate may be e.g. 3%, i.e. 3% of the number of dropped user equipment connections out of the total number of established connections made by the one or more user equipment 120 to the network node 110 during the measurement period.

The threshold value may further be predetermined such as e.g. be set to 3%. Thus 3% of the RRC connection attempts made by the one or more user equipment 120 during the measurement period may fail, according to some embodiments.

It is to be noted that the here exemplified threshold value of 3% is to be regarded as a non-limiting example only. Such threshold value may be set to e.g. 0.5%, 1%, 2%, 3.5%, 5%, 10%, 30% or any other appropriate value in between, below or above these values, that is considered appropriate.

Action 306

The size of the cell 115 is adjusted, based on the result of the comparison 305 of the estimated 304 parameter value with the threshold value.

The adjustment of the size of the cell 115 may comprise expanding the cell 115 if the estimated 304 parameter value related to the number of unsuccessful network connection attempts made by one or more user equipment 120 during the measurement period and/or the number of dropped user equipment connections during the measurement period is lower than the threshold value. Further, the size of the cell 115 may be expanded by decreasing a cell edge threshold value related to the extension of the cell border, which cell edge threshold value may serve as a threshold value for a user equipment 120 attempting to be served by the network node 110 in the cell 115, such that the user equipment 120 may be served by the network node 110 if the received signal strength exceeds the cell edge threshold value, according to some embodiments.

However, according to some embodiments, the adjustment of the size of the cell 115 comprises decreasing the cell 115 if the estimated 304 parameter value related to the number of unsuccessful network connection attempts made by one or more user equipment 120 during the measurement period and/or the number of dropped user equipment connections to the network node 110 during the measurement period exceeds the threshold value. Further, the size of the cell 115 may be decreased by increasing a cell edge threshold value related to the extension of the cell border, which cell edge threshold value serve as a threshold value for the user equipment 120 attempting to be served by the network node 110 in the cell 115, such that the user equipment 120 may be served by the network node 110 if the received signal strength exceeds the cell edge threshold value, according to some embodiments.

Further, the cell 115 to be adjusted may comprise the connected mode cell 115-1 and the idle mode cell 115-2 according to some embodiments, wherein the connected mode cell 115-1 may be related to the idle mode cell 115-2 by an offset value. The connected mode cell 115-1 may further be adjusted by adding the offset value to the cell edge threshold parameter related to the extension of the cell border of the idle mode cell 115-2. The offset value may be predetermined or configurable by e.g. the operator. The offset value may be set to e.g. 3 dB, as a non-limiting example. However, it may be noted that the offset value may be set to any other value comprising also 0 dB, and/or a negative value such as −1 dB, according to different embodiments.

Further, according to alternative embodiments, the connected mode cell 115-1 may be adjusted by changing the value of a cell edge threshold parameter in connected mode, according to some embodiments, such as e.g. changing the value of an eventA2Threshold parameter, or an eventB2Threshold parameter. Thereby, the connected mode cell 115-1 may be adjusted independently from any adjustment of the idle mode cell 115-2.

The size of the idle mode cell 115-2 may be adjusted by changing the value of the cell edge threshold parameter in idle mode, according to some embodiments, such as e.g. changing the value of a Qrxlevmin parameter.

It may in addition be noted that the size of the cell 115 may remain maintained, i.e. not adjusted at all, if none of the conditions for expanding or decreasing the cell 115 as mentioned above is fulfilled, as may be the case.

Further, according to some embodiments, the above described actions 303-306 may be performed when the counted 301 number of RRC connection attempts made by the one or more user equipment 120 during the measurement period, and/or the total number of established connections made by the one or more user equipment 120 to the network node 110 during the measurement period exceeds the second threshold value.

Thereby, the actions of counting 303, estimating 304, comparing 305 and adjusting 306 may be performed when the counted 301 number of RRC connection attempts made by the one or more user equipment 120 during the measurement period, and/or the total number of established connections made by the one or more user equipment 120 to the network node 110 during the measurement period exceeds the second threshold value.

Thus the actions of the counting 303 of the number of failed RRC connection attempts, and/or the number of dropped user equipment connections during the measurement period, the estimation 304 of the ratio between the number of failed RRC connection attempts and the total number of RRC connection attempts made by the one or more user equipment 120 during the measurement period, and/or the ratio between the number of dropped user equipment connections and the total number of established connection made by the one or more user equipment 120 to the network node 110 during the measurement period, the comparison 305 of the estimated 304 ratio with the threshold value, and the adjustment 306 of the size of the cell 115 may be performed when the counted 301 number of RRC connection attempts made by the one or more user equipment 120 during the measurement period, and/or the total number of established connections made by the one or more user equipment 120 to the network node 110 during the measurement period exceeds the second threshold value, according to some embodiments.

It may thereby be ascertained that a sufficiently large number of RRC connection attempts made by the one or more user equipment 120 during the measurement period and/or the total number of established connections made by the one or more user equipment 120 to the network node 110 during the measurement period has been counted. If, for example, no RRC connection attempts have been made, there may be no point in performing the other subsequent actions; time and processing resources may be saved. Further, if very few RRC connection attempts have been made, the repeated failure of one single defective user equipment 120 may be allowed to influence the size of the cell 115, which may not be desired.

Such sufficiently large number, i.e. the second threshold, may be set to e.g. 60 according to some embodiments. It is to be noted that another number of procedures than 60 may be considered appropriate for a sufficiently large statistical base, such as e.g. 2, 10, 50, 100, 400, or any other appropriate number in between, below or above these values.

Figure 4:
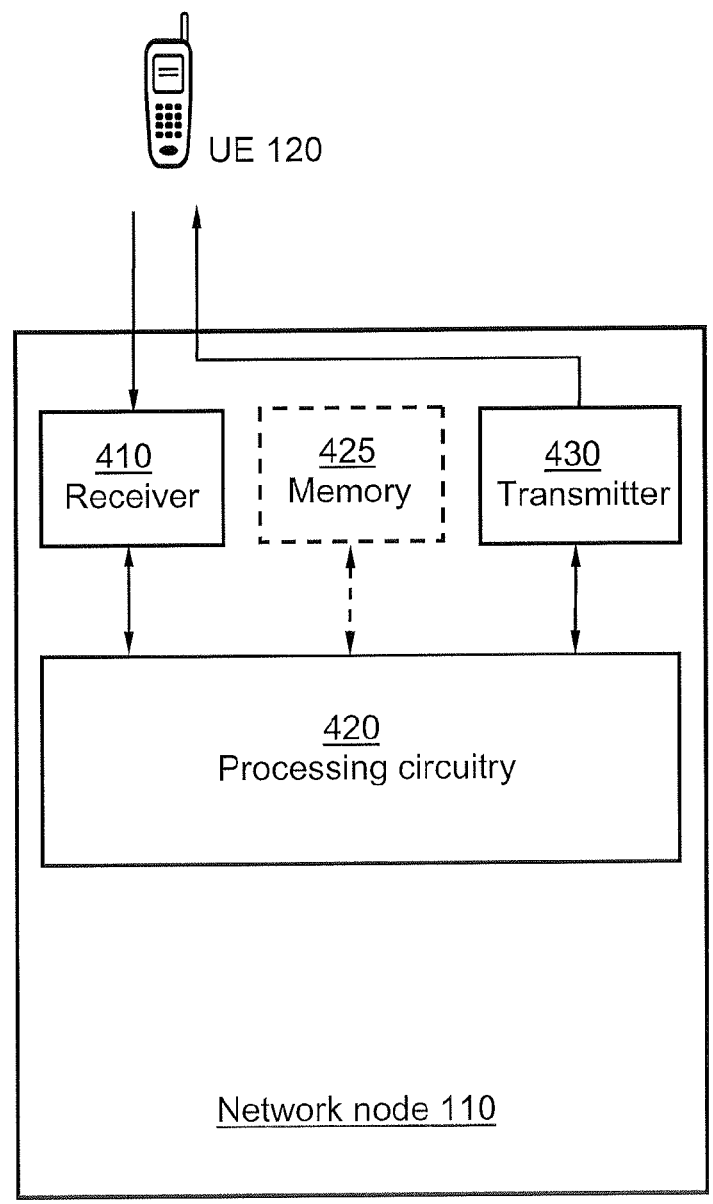
FIG. 4 is a block diagram illustrating embodiments of a network node.

FIG. 4 is a block diagram illustrating a network node 110, configured to perform at least some of the described actions 301-306 comprised within embodiments of the above disclosed method. The network node 110 is comprised in a wireless communication system 100, such as e.g. LTE. The network node 110 may be configured to perform any, some or all of the previously described actions 301-306 for adjusting cell size of a cell 115, served by the network node 110. The cell 115 to be adjusted may comprise an idle mode cell 115-2 and a connected mode cell 115-1, which may be related to each other by an offset value according to some embodiments. According to some alternative embodiments, the idle mode cell 115-2 and the connected mode cell 115-1 may be configured by different threshold values. Further, the network node 110 may be configured to serve a user equipment 120, within the cell 115.

For the sake of clarity, any internal electronics or other components of the network node 110, not completely indispensable for understanding the disclosed method has been omitted from FIG. 4.

In order to perform the actions 301-306 correctly, the network node 110 comprises a processing circuitry 420. The processing circuitry 420 is configured to estimate a parameter value, related to the number of unsuccessful network connection attempts made by one or more user equipment 120 during a measurement period. Alternatively, or in addition, the processing circuitry 420 is also configured to estimate the number of dropped user equipment connections to the network node 110 during the measurement period. Further, the processing circuitry 420 is also configured to compare the estimated parameter value with a threshold value. Additionally, the processing circuitry 420 is further configured to adjust the size of the cell 115, based on the result of the comparison of the estimated parameter value with the threshold value.

The parameter value may comprise a ratio between the number of failed Radio Resource Control (RRC) connection attempts made by the one or more user equipment 120 and the total number of RRC connection attempts made by the one or more user equipment 120 during the measurement period, according to some embodiments. Alternatively, or in addition, the parameter value may comprise a ratio between the number of dropped user equipment connections and the total number of established connections made by the one or more user equipment 120 to the network node 110 during the measurement period.

The processing circuitry 420 may further be configured to count the number of RRC connection attempts made by the one or more user equipment 120 during the measurement period, and/or the total number of established connections made by the one or more user equipment 120 to the network node 110 during the measurement period.

The processing circuitry 420 may in addition be further configured to count the number of failed RRC connection attempts made by the one or more user equipment 120 during the measurement period. Alternatively, or in addition, the processing circuitry 420 may be configured to count the number of dropped user equipment connections to the network node 110 during the measurement period.

The processing circuitry 420 may also according to some embodiments be further configured to compare the counted number of RRC connection attempts made by the one or more user equipment 120 during the measurement period. Alternatively, or in addition, the processing circuitry 420 may be configured to compare the total number of established connections made by the one or more user equipment 120 to the network node 110 during the measurement period with a second threshold value.

Embodiments of the processing circuitry 420 may further be configured to perform the subsequently enumerated actions 303, 304, 305 and 306 when the counted number of RRC connection attempts made by the one or more user equipment 120 during the measurement period, and/or the total number of established connections made by the one or more user equipment 120 to the network node 110 during the measurement period exceeds the second threshold value.

Thereby, the processing circuitry 420 may be further configured to suspend the actions of counting 303, estimating 304, comparing 305 and adjusting 306, when the counted number of RRC connection attempts made by the one or more user equipment 120 during the measurement period, and/or the total number of established connections made by the one or more user equipment 120 to the network node 110 during the measurement period does not exceed the second threshold value.

The processing circuitry 420 may further be configured to adjust the size of the cell 115 by expanding the cell 115, if the estimated parameter value related to any of the number of unsuccessful network connection attempts made by one or more user equipment 120 during the measurement period and/or the number of dropped user equipment connections to the network node 110 during the measurement period is lower than the threshold value. Thereby, according to some embodiments, the processing circuitry 420 may be configured to expand the cell 115 by decreasing a cell edge threshold value related to the extension of the cell border, which cell edge threshold value serve as a threshold value for a user equipment 120 attempting to be served by the network node 110 in the cell 115, such that the user equipment 120 is served by the network node 110 if the received signal strength exceeds the cell edge threshold value.

In further addition, the processing circuitry 420 may also be configured to adjust the size of the cell 115 by decreasing the cell 115 if the estimated parameter value related to the number of unsuccessful network connection attempts made by one or more user equipment 120 during the measurement period and/or the number of dropped user equipment connections to the network node 110 during the measurement period exceeds the threshold value. Thereby, the processing circuitry 420 may be configured to decrease the cell 115 by increasing a cell edge threshold value related to the extension of the cell border, which cell edge threshold value serve as a threshold value for the user equipment 120 attempting to be served by the network node 110 in the cell 115.

The processing circuitry 420 may also be configured to filter out any unsuccessful network connection attempts and/or dropped user equipment connections to the network node 110, which is made by a user equipment 120 which is not situated within a predefined distance from the cell border of the cell 115.

The cell 115 to be adjusted may comprise a connected mode cell 115-1 and an idle mode cell 115-2, according to some embodiments.

The processing circuitry 420 may be further configured to adjust the connected mode cell 115-1 by adding an offset value to the cell edge threshold parameter related to the extension of the cell border of the idle mode cell 115-2.

The processing circuitry 420 may according to some alternative be further configured to adjust the connected mode cell 115-1 by changing the value of a cell edge threshold parameter in connected mode.

The processing circuitry 420 may be configured to adjust the size of the idle mode cell 115-2 by changing the value of a cell edge threshold parameter in idle mode according to some embodiments. Such idle mode cell edge threshold parameter may comprise a Qrxlevmin parameter.

The processing circuitry 420 may be configured to maintain the cell size, if none of the conditions for expanding or decreasing the cell 115 is fulfilled.

Furthermore, the processing circuitry 420 may be further configured to recognise a successful RRC connection attempt by receiving a RRC connection request from the user equipment 120, providing a RRC connection setup to the user equipment 120 and receiving a RRC connection setup complete from the user equipment 120.

The processing circuitry 420 may further in addition be configured to recognise an unsuccessful RRC connection attempt by receiving a RRC connection request from the user equipment 120, but not receiving a corresponding RRC connection setup complete from the user equipment 120.

The network node 110 may comprise a receiver 410, configured to receive a RRC connection request and/or a RRC connection setup complete from the user equipment 120.

According to some embodiments, the network node 110 may also, additionally, comprise a transmitter 430, configured to transmit radio signals to be received by the user equipment 120 within the cell 115. Further, the transmitter 430 may be configured to transmit a RRC connection setup, to be received by the user equipment 120.

The herein discussed measurement period may be set to a predefined or configurable time value. Further the processing circuitry 420 may further be configured to perform the method periodically at a time interval according to some embodiments.

The processing circuitry 420 described herein may comprise e.g. one or more instances of a Central Processing Unit (CPU), a processing unit, a processor, a microprocessor, or other processing logic that may interpret and execute instructions. The processing circuitry 420 may further perform data processing functions for inputting, outputting, and processing of data comprising data buffering and device control functions, such as call processing control, user interface control, or the like.

The processing circuitry 420 may comprise a combination of digital signal processors and dedicated signal processing chips used to modulate calls/data traffic into one or more digital carrier(s) to be forwarded to the transmitter 430 and for receiving digital data from the receiver 410 and detect/demodulate it into received calls/traffic, according to some embodiments, for providing cell adjustment.

Furthermore, according to some embodiments, the network node 110 may comprise at least one memory 425. The memory 425 may comprise a physical device utilized to store data or programs i.e. sequences of instructions, on a temporary or permanent basis. According to some embodiments, the memory 425 may comprise integrated circuits comprising silicon-based transistors. Further, the memory 425 may be volatile or non-volatile.

Further, it is to be noted that some of the described units 410-430 comprised within the network node 110 are to be regarded as separate logical entities but not with necessity separate physical entities.

The actions 301-306 to be performed in the network node 110 may be implemented through one or more processing circuitries 420 in the network node 110, together with computer program code for performing the functions of the present actions 301-306 for adjusting a cell size. Thus a computer program product, comprising instructions for performing the actions 301-306 in the network node 110 may perform at least some of the actions 301-306, when being loaded into the one or more processing circuitries 420.

The computer program product mentioned above may be provided for instance in the form of a data carrier carrying computer program code for performing at least some of the actions 301-306 according to some embodiments when being loaded into the processing circuitry 420. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the network node 110 remotely, e.g. over an Internet or an intranet connection.

The terminology used in the detailed description of the particular embodiments illustrated in the accompanying drawings are not intended to be limiting of the network node and method described herein.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" comprises any and all combinations of one or more of the associated listed items.

The invention claimed is:

1. A method in a base station comprised in a wireless communication system, the base station comprising processing circuitry for automatically adjusting the size of a cell served by the base station, the method comprising:
estimating, by the processing circuitry, a parameter value related to the number of unsuccessful connection attempts made by one or more user equipments with respect to the base station during a measurement period and/or related to the number of connections between the base station and one or more user equipments that are dropped during the measurement period;

comparing, by the processing circuitry, the estimated parameter value with a threshold value; and adjusting, by the processing circuitry, the size of the cell based on the comparison result, wherein adjusting the size of the cell comprises decreasing the size of the cell if the estimated parameter value exceeds the threshold value, and wherein the size of the cell is decreased by increasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value.

2. The method according to claim 1, wherein the parameter value comprises at least one of:
a ratio between the number of failed Radio Resource Connection, RRC, connection attempts and the total number RRC connection attempts with respect to the base station during the measurement period; and
a ratio between the number of RRC connections dropped and the total number of RRC connections established with respect to the base station during the measurement period.

3. The method according to claim 2, further comprising at least one of:
counting said total number of RRC connection attempts and said number of failed connection attempts; and
counting said total number of RRC connections established and said number of RRC connections dropped.

4. The method according to claim 3, further comprising:
comparing the counted total number of RRC connections established and/or the counted total number of RRC connection attempts to a second threshold value; and
wherein said steps of counting, estimating, comparing and adjusting as set forth in claim 1 are performed when the counted total number of RRC connections established and/or the counted total number of RRC connection attempts exceeds the second threshold value.

5. The method according to claim 1, wherein adjusting the size of the cell comprises expanding the size of the cell if the estimated parameter value is lower than the threshold value, and wherein the size of the cell is expanded by decreasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value.

6. The method according to claim 1, further comprising filtering out any unsuccessful connection attempts and/or dropped connections that are associated with user equipments not situated within a predefined distance from the cell border of the cell.

7. The method according to claim 1, wherein the cell to be adjusted comprises a connected mode cell and an idle mode cell, and wherein the method includes adjusting the idle mode cell by increasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value, and includes adjusting the connected mode cell by adding an offset value to the cell edge threshold value.

8. The method according to claim 1, wherein the cell to be adjusted comprises a connected mode cell and an idle mode cell, and wherein the method includes adjusting the idle mode cell by increasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value, and includes adjusting the connected mode cell by changing the cell edge threshold value for connected mode.

9. The method according to claim 1, wherein adjusting the size of the cell comprises, for idle mode, changing a cell edge threshold value in idle mode, and wherein the cell threshold value serves as a threshold value for a received signal strength of the cell as perceived at a user equipment.

10. The method according to claim 1, wherein the size of the cell is maintained, if conditions for expanding or decreasing the cell are not fulfilled.

11. The method according to claim 1, wherein a successful connection attempt comprises a successful Radio Resource Control, RRC, connection attempt and comprises:
receiving a RRC connection request from the user equipment;
providing a RRC connection setup to the user equipment; and
receiving a RRC connection setup complete from the user equipment; and
wherein an unsuccessful RRC connection attempt comprises receiving a RRC connection request from the user equipment, but not receiving a corresponding RRC connection setup complete from the user equipment.

12. The method according claim 1, wherein the measurement period is set to a predefined time value, and wherein the method is performed periodically at a time interval.

13. A base station configured for operation in a wireless communication system, for automatically adjusting size of a cell served by the base station, said base station comprising processing circuitry configured to:
estimate a parameter value related to the number of unsuccessful connection attempts made by one or more user equipments with respect to the base station during a measurement period and/or related to the number of connections between the base station and one or more user equipments that are dropped during the measurement period;
compare the estimated parameter value with a threshold value; and
adjust the size of the cell based on the comparison result by decreasing the size of the cell if the estimated parameter value exceeds the threshold value, and wherein the size of the cell is decreased by increasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value.

14. The base station according to claim 13, wherein the parameter value comprises at least one of:
a ratio between the number of failed Radio Resource Connection, RRC, connection attempts and the total number RRC connection attempts with respect to the base station during the measurement period; and
a ratio between the number of RRC connections dropped and the total number of RRC connections established with respect to the base station during the measurement period.

15. The base station according to claim 14, wherein the processing circuitry is configured to:
count said total number of RRC connection attempts and said number of failed connection attempts; and
count said total number of RRC connections established and said number of RRC connections dropped.

16. The base station according to claim 15, wherein the processing circuitry is configured to:
compare the counted total number of RRC connections established and/or the counted total number of RRC connection attempts to a second threshold value; and
suspend performing the count, estimate, compare and adjust operations as set forth in claim 13 responsive to the counted total number of RRC connections established and/or the counted total number of RRC connection attempts not exceeding the second threshold value.

17. The base station according to claim 13, wherein the processing circuitry is configured to adjust the size of the cell by expanding the size of the cell if the estimated parameter value is lower than the threshold value, and wherein the size of the cell is expanded by decreasing a cell edge threshold value related to the extension of the cell border, which cell edge threshold value serves as a threshold value for a user equipment attempting to be served by the base station in the cell, such that the user equipment is served by the base station if a received signal strength as perceived at the user equipment for the cell exceeds the cell edge threshold value.

18. The base station according to claim 13, wherein the processing circuitry is configured to filter out any unsuccessful connection attempts and/or dropped connections that are associated with user equipments not situated within a predefined distance from the cell border of the cell.

19. The base station according to claim 13, wherein the cell to be adjusted comprises a connected mode cell and an idle mode cell, and wherein the processing circuitry is configured to adjust the connected mode cell by adding an offset value to a cell edge threshold value related to the extension of the cell border of the idle mode cell.

20. The base station according to claim 13, wherein the cell to be adjusted comprises a connected mode cell and an idle mode cell, and wherein the processing circuitry is configured to adjust the connected mode cell by changing a cell edge threshold value in connected mode, said cell edge threshold being related to the cell border of the connected mode cell.

21. The base station according to claim 13, wherein the processing circuitry is configured to adjust the size of the cell for idle mode by changing a cell edge threshold value in idle mode.

22. The base station according to claim 13, wherein the processing circuitry is configured to maintain the cell size, if conditions for expanding or decreasing the cell are not fulfilled.

23. The base station according to claim 13, further comprising:
a receiver, configured to receive a RRC connection request and/or a RRC connection setup complete from the user equipment, and
a transmitter configured to transmit a RRC connection setup, to be received by the user equipment, and wherein
the processing circuitry is further configured to recognize a successful RRC connection attempt by receiving a RRC connection request from the user equipment, providing a RRC connection setup to the user equipment and receiving a RRC connection setup complete from the user equipment, and wherein
the processing circuitry is further configured to recognize an unsuccessful RRC connection attempt by receiving a RRC connection request from the user equipment, but not receiving a corresponding RRC connection setup complete from the user equipment.

24. The base station according to claim 13, wherein the measurement period is set to a predefined time value, and wherein the processing circuitry is further configured to perform the method periodically at a time interval.

* * * * *